(12) United States Patent
Yun et al.

(10) Patent No.: US 12,176,578 B2
(45) Date of Patent: Dec. 24, 2024

(54) BUS BAR HAVING EXCELLENT INSULATION AND HEAT DISSIPATION PERFORMANCE AND BATTERY MODULE INCLUDING THE SAME

(71) Applicant: LG Energy Solution, Ltd., Seoul (KR)

(72) Inventors: Sun-Woo Yun, Daejeon (KR); Min-Jun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 606 days.

(21) Appl. No.: 17/442,679

(22) PCT Filed: Jul. 20, 2020

(86) PCT No.: PCT/KR2020/009559
§ 371 (c)(1),
(2) Date: Sep. 24, 2021

(87) PCT Pub. No.: WO2021/029549
PCT Pub. Date: Feb. 18, 2021

(65) Prior Publication Data
US 2022/0166114 A1    May 26, 2022

(30) Foreign Application Priority Data

Aug. 12, 2019 (KR) .................. 10-2019-0098321

(51) Int. Cl.
*H01M 50/526* (2021.01)
*H01M 10/613* (2014.01)
*H01M 10/653* (2014.01)

(52) U.S. Cl.
CPC ....... *H01M 50/526* (2021.01); *H01M 10/613* (2015.04); *H01M 10/653* (2015.04); *H01M 2220/10* (2013.01); *H01M 2220/20* (2013.01)

(58) Field of Classification Search
None
See application file for complete search history.

(56) References Cited

U.S. PATENT DOCUMENTS

2010/0015512 A1    1/2010  Inoue et al.
2011/0070474 A1    3/2011  Lee et al.
(Continued)

FOREIGN PATENT DOCUMENTS

CN    104885319 A    9/2015
CN    105900181 A    8/2016
(Continued)

OTHER PUBLICATIONS

Search Report dated Dec. 14, 2022 from the Office Action for Chinese Application No. 202080031114.6 issued Dec. 20, 2022, 4 pages. [See p. 2, categorizing the cited references].
(Continued)

*Primary Examiner* — Carlos Barcena
(74) *Attorney, Agent, or Firm* — Lerner David LLP

(57) ABSTRACT

An aluminum bus bar includes an insulation portion having an oxide film insulation layer, and electric conduction portions having electric conductivity and disposed with the insulation portion being interposed therebetween. Also, a battery module includes the aluminum bus bar; a cell assembly having battery cells; an electric component electrically connected to the cell assembly by means of the aluminum bus bar; and a heatsink disposed at one side of the cell assembly to exchange heat with the cell assembly, and the insulation portion of the aluminum bus bar is disposed in contact with one surface of the heatsink.

10 Claims, 5 Drawing Sheets

(a)

(b)

(c)

(56) References Cited

U.S. PATENT DOCUMENTS

| | | |
|---|---|---|
| 2015/0030890 A1 | 1/2015 | Inque |
| 2015/0255192 A1 | 9/2015 | Ogawa et al. |
| 2016/0073506 A1* | 3/2016 | Coakley ............ H01M 50/522 |
| | | 156/60 |
| 2016/0305036 A1 | 10/2016 | Silberbauer et al. |
| 2018/0166756 A1 | 6/2018 | Inoue et al. |
| 2019/0074557 A1 | 3/2019 | Shin et al. |
| 2020/0037436 A1 | 1/2020 | Won et al. |

FOREIGN PATENT DOCUMENTS

| | | |
|---|---|---|
| CN | 108140793 A | 6/2018 |
| CN | 208589746 U | 3/2019 |
| CN | 110073461 A | 7/2019 |
| EP | 2104121 A1 | 9/2009 |
| JP | H11203944 A | 7/1999 |
| JP | 2009238831 A | 10/2009 |
| JP | 2011216802 A | 10/2011 |
| JP | 2012058199 A | 3/2012 |
| JP | 2014216248 A | 11/2014 |
| JP | 2014220102 A | 11/2014 |
| JP | 2015012628 A | 1/2015 |
| JP | 2015026569 A | 2/2015 |
| JP | 2018174042 A | 11/2018 |
| JP | 2018538664 A | 12/2018 |
| KR | 20100109871 A | 10/2010 |
| KR | 101085284 B1 | 11/2011 |
| KR | 20150089050 A | 8/2015 |
| KR | 20160054117 A | 5/2016 |
| KR | 20170095052 A | 8/2017 |
| WO | 2018111001 A1 | 6/2018 |

OTHER PUBLICATIONS

International Search Report for PCT/KR2020/009559 mailed Oct. 27, 2020; 3 pages.
Extended European Search Report for Application No. 20851717.7 dated Jul. 28, 2022. 8 pgs.

* cited by examiner (a)

(b)

(c)

BUS BAR HAVING EXCELLENT INSULATION AND HEAT DISSIPATION PERFORMANCE AND BATTERY MODULE INCLUDING THE SAME

CROSS-REFERENCE TO RELATED APPLICATION

The present application is a national phase entry under 35 U.S.C. § 371 of International Application No. PCT/KR2020/009559 filed Jul. 20, 2020, published in Korean, which claims priority from Korean Patent Application No. 10-2019-0098321 filed Aug. 12, 2019, all of which are incorporated herein by reference.

TECHNICAL FIELD

The present disclosure relates to a bus bar and a battery module including the bus bar, and more particularly, to a battery module using a bus bar having excellent insulation and heat dissipation performance as an electric connection means.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

Recently, secondary batteries are widely used not only in small devices such as portable electronic devices but also in middle-sized or large-sized devices such as vehicles and energy storage systems (ESS). When used in such a medium-sized or large-sized device, a large number of secondary batteries are electrically connected to form a battery module or a battery pack in order to increase capacity and output.

Meanwhile, a bus bar is widely used as an electrical connection means for high current connection of a battery module or a battery pack.

The bus bar generally has a bar shape made of metal with certain width, thickness and length and good electrical conductivity, and has safety and low energy loss even when high current is applied thereto. Since high current commonly flows in the bus bar, in case where the bus bar is used without insulation or covering, there is a risk of electric shock if a worker is not careful when assembling, repairing or replacing the bus bar. Thus, as shown in FIG. 1, a bus bar 1 is wrapped with a tube 2 or a plastic cover to secure insulation.

However, if the current flowing through the bus bar 1 has very strong intensity, the tube 2 or the plastic cover may melt due to the self-heating of the bus bar not to function normally. Further, the heat of the bus bar may cause the tube 2 or the plastic cover to ignite and spread damage to the surroundings.

To prevent this phenomenon in advance, it is necessary to cool the bus bar 1 such that its temperature is managed below a certain temperature. However, even if the conventional bus bar 1 is in direct contact with a cooling medium such as a heatsink to cool the same, since the contact area of the bus bar 1 has insulation and is wrapped with a tube or plastic with low thermal conductivity of less than 1 W/mK, the heat is not transferred well.

SUMMARY

Technical Problem

The present disclosure is directed to effectively managing insulation and heat dissipation of a bus bar and further securing the safety of a battery module.

Other objects and advantages of the present disclosure will be described below, and will be appreciated by embodiments of the present disclosure. In addition, the objects and advantages of the present disclosure can be realized by components defined in the claims and a combination thereof.

Technical Solution

In one aspect of the present disclosure, there is provided a bus bar, comprising: an insulation portion including an oxide film insulation layer; and first and second electric conduction portions having electric conductivity, wherein the insulation portion is interposed between the first and second electric conduction portions, wherein the bus bar is an aluminum bus bar.

The oxide film insulation layer may have an aluminum oxide ($Al_2O_3$) layer formed on a surface of the insulation portion.

In another aspect of the present disclosure, there is also provided a battery module, comprising: the bus bar; a cell assembly including a plurality of battery cells; an electric component electrically connected to the cell assembly by the bus bar; and a heatsink disposed at one side of the cell assembly and adapted to exchange heat with the cell assembly, wherein the insulation portion of the bus bar is in contact with a first surface of the heatsink.

The battery module may further comprise an electric component housing in which the electric component is the first or second electric conduction portion of the bus bar may be mounted to the electric component housing, and the electric component housing may be mounted to the heatsink.

The electric component housing may include a base plate in surface contact with the first surface of the heatsink, the base plate may include a tunnel portion extending from an edge of the base plate portion toward a center of the base plate portion, wherein the tunnel portion includes a receiving space facing towards the base plate, and a first part of the insulation portion may be positioned within the receiving space of the tunnel portion.

The first part of the insulation portion may be disposed in contact with the first surface of the heatsink and covered by the tunnel portion of the base plate.

A plate surface of the base plate may include a clearance in front of an end of the tunnel portion, and the electric conduction portion may extend through the clearance, wherein the electric conduction portion includes at least one bend to connect the insulation portion an electrode terminal of the electric component.

The cell assembly may further include a cell case configured to accommodate the plurality of battery cells, and the cell case is in contact with a second surface of the heatsink.

The battery module may further comprise a silicone gel-type thermally conductive pad positioned between the insulation portion of the bus bar and the heatsink.

In still another aspect of the present disclosure, there is also provided a battery pack, comprising the battery module of any of the embodiments described herein.

Advantageous Effects

According to one aspect of the present disclosure, a bus bar having excellent insulation and heat dissipation may be provided.

According to another aspect of the present disclosure, temperature of the bus bar and the battery cells may be managed, thereby providing a battery module with improved safety.

In particular, since the battery module simultaneously cools the bus bar and the battery cells with one heatsink, it is possible to reduce the number of cooling components and improve space efficiency.

The effects of the present disclosure are not limited to the above, and effects not mentioned herein may be clearly understood from the present specification and the accompanying drawings by those skilled in the art.

DETAILED DESCRIPTION

Figure 1:
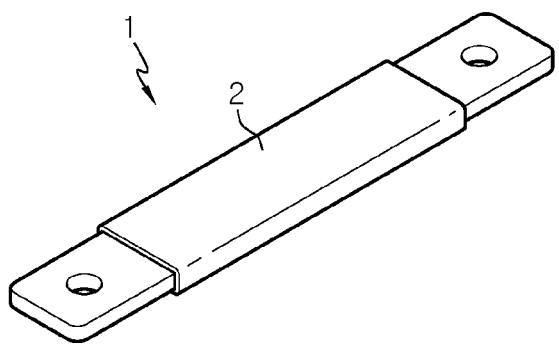
FIG. 1 is a perspective view showing a conventional bus bar.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
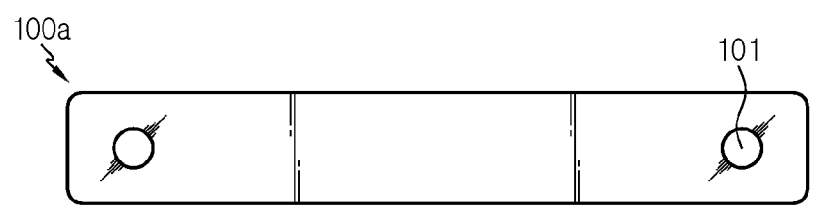
FIG. 2 is a diagram for illustrating a process of manufacturing an aluminum bus bar according to the present disclosure.
Figure 2:
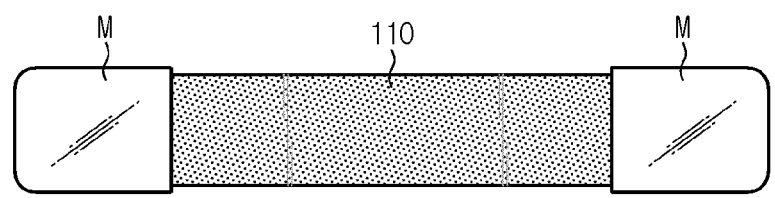
Figure 2:
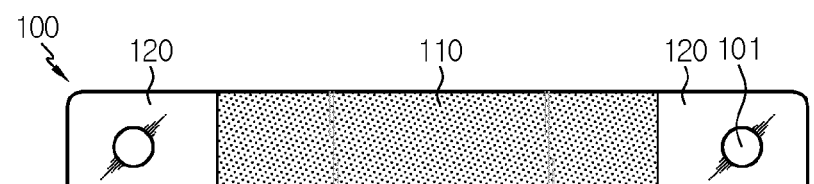
Figure 3:
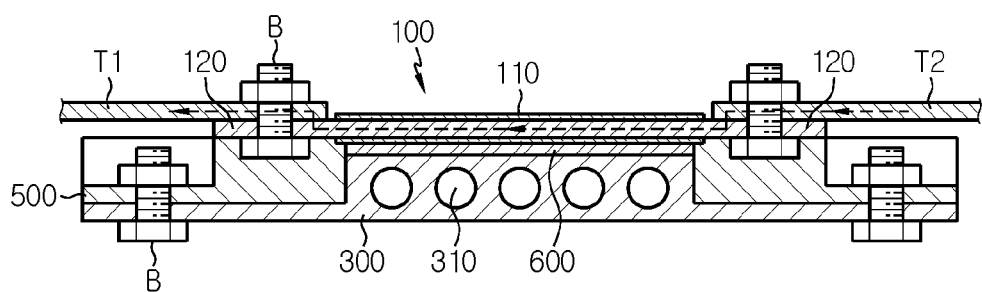
FIG. 3 is a diagram showing an example where the aluminum bus bar of FIG. 2 is installed for cooling.

FIG. 2 is a diagram for illustrating a process of manufacturing an aluminum bus bar according to the present disclosure, and FIG. 3 is a diagram showing an example where the aluminum bus bar of FIG. 2 is installed for cooling.

Referring to these figures, a bus bar according to the present disclosure is an aluminum bus bar 100, which includes an insulation portion 110 having an oxide film insulation layer and electric conduction portions 120 having electric conductivity and disposed with the insulation portion 110 being interposed therebetween.

The insulation portion 110 is a region other than the electric conduction portion 120, and a surface of the insulation portion 110 may be formed as an aluminum oxide ($Al_2O_3$) layer. The aluminum oxide layer may be formed by anodizing the surface of the aluminum bus bar 100. Here, anodizing is a post-treatment method for the surface of aluminum, and a natural oxidation process that occurs when aluminum meets oxygen is artificially performed using an electro-chemical reaction to apply an oxide coating on the surface of aluminum. For example, if an electrode is connected to aluminum and immersing in an electrolyte, an aluminum oxide film may be evenly coated.

Referring to FIG. 2, a process of manufacturing the aluminum bus bar 100 according to the present disclosure will be described briefly as follows.

First, as shown in (a) of FIG. 2, a bus bar 100a having certain thickness, width and length is manufactured using aluminum. The electric conduction portions 120 are parts corresponding to both ends of the aluminum bus bar 100 and respectively have a hole 101. The hole 101 may be used to insert a bolt B when the bus bar is connected to a terminal of an external device or another bus bar.

In this embodiment, a straight bus bar is manufactured as an example, but the bus bar may be manufactured to have various paths by bending, bending, twisting, or the like depending on the location where the bus bar is to be used.

After that, as shown in (b) of FIG. 2, a masking tape M is attached to the electric conduction portion 120, or the electric conduction portion 120 is masked using a chemical masking agent, and the surface of the other region of the bus bar is anodized.

After that, as shown in (c) of FIG. 2, the masking tape is removed, thereby completing the process for manufacturing an aluminum bus bar.

Aluminum oxide exhibits corrosion resistance, abrasion resistance and electrical insulation, and has a high thermal conductivity of about 20 W/mk. In the aluminum bus bar 100 according to the present disclosure, the insulation portion 110 is surface-treated with the aluminum oxide, so even if the surface of the insulation portion 110 comes into contact with a metal, the insulation portion 110 is not electrically connected to the metal. In addition, when the aluminum bus bar 100 heats by itself, the heat may be smoothly dissipated to the outside through the aluminum oxide layer of the insulation portion 110.

An example where the aluminum bus bar 100 is used will be described with reference to FIG. 3.

It is very difficult or impossible to allow a typical aluminum or copper bus bar to make direct contact with a cooling plate or a heatsink 300 due to insulation or coating problems. However, the anodized aluminum bus bar 100 according to the present disclosure has excellent insulation and heat dissipation as described above, so the aluminum bus bar 100 according to the present disclosure may directly contact the cooling plate or the heatsink 300.

For example, as shown in FIG. 3, the aluminum bus bar 100 of the present disclosure may be connected to the electrode terminal of the electric component 400 or other bus bars T1, T2 by fastening the bolt B.

For reference, since the aluminum oxide layer described above is provided on the surface of the insulation portion 110, there is no problem in electric connection through the aluminum bus bar 100, like the current flow line shown in FIG. 3.

As a bus bar cooling configuration to dissipate heat caused by high current flowing through the aluminum bus bar 100, the aluminum bus bar 100 may be mounted to a partially opened electric component housing 500, and the insulation portion 110 of the aluminum bus bar 100 may be in contact with the heatsink 300 through the opened space. In addition, in order to further increase the thermal conductivity between the insulation portion 110 and the heatsink 300, a thermally conductive pad 600 may be further interposed therebetween.

The heatsink 300 is not particularly limited as long as it is capable of contacting the aluminum bus bar 100 and absorbing heat from the aluminum bus bar 100, and in this embodiment, a cooling plate having a plurality of flow paths 310 therein is used as the heatsink 300.

Figure 4:
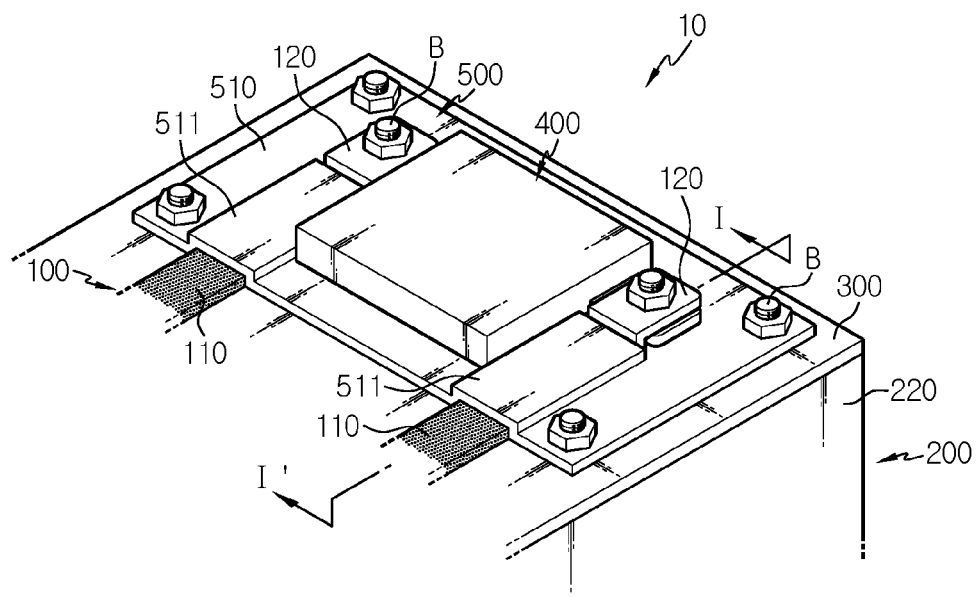
FIG. 4 is a partial perspective view schematically showing a battery module according to an embodiment of the present disclosure.
Figure 5:
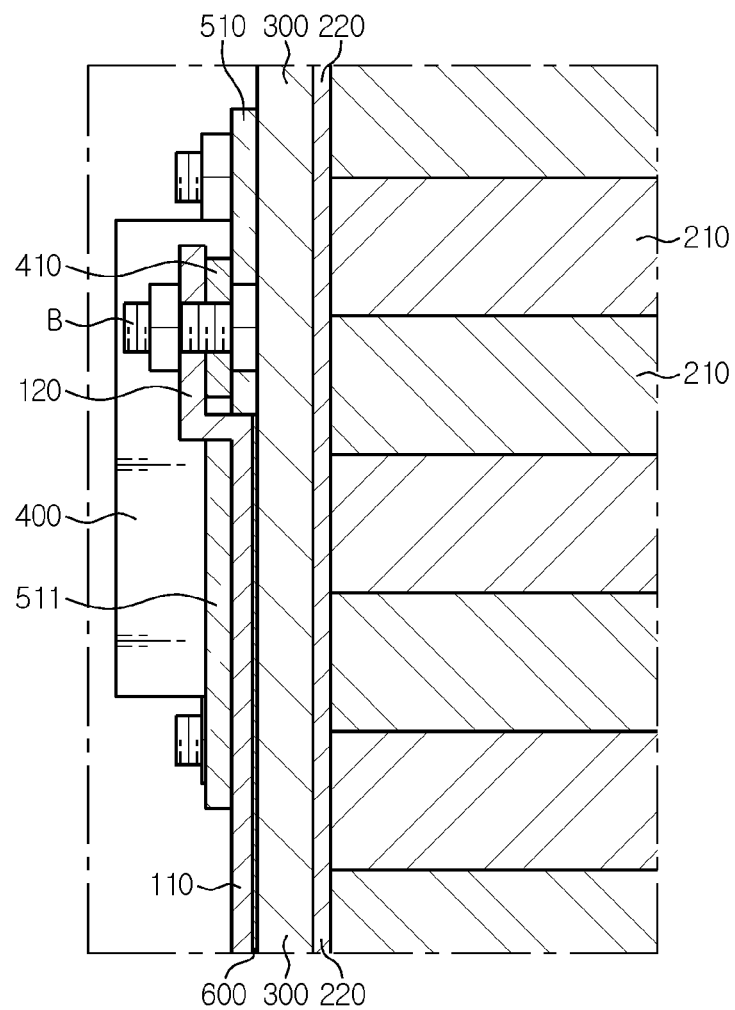
FIG. 5 is a sectional view, taken along the line I-I' of FIG. 4.
Figure 6:
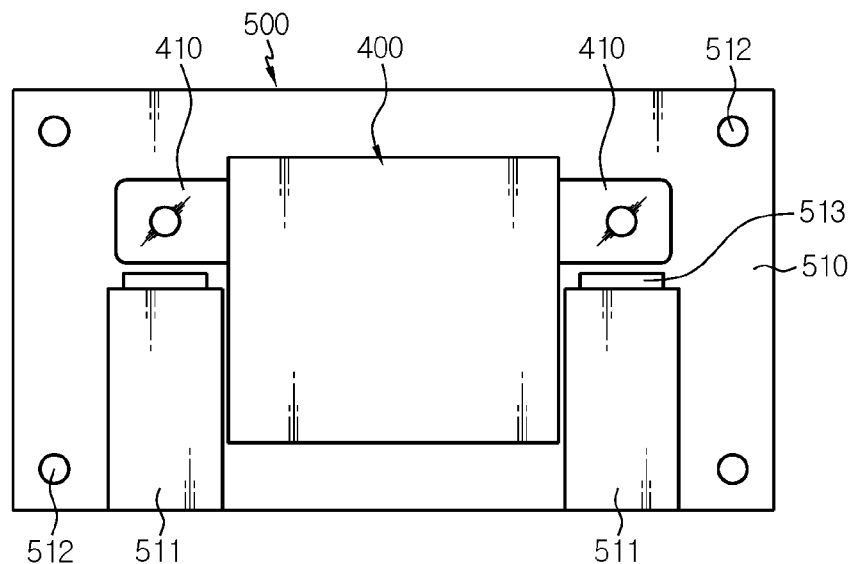
FIG. 6 is a plan view schematically showing a portion of an electric component housing of the battery module according to an embodiment of the present disclosure.
Figure 7:
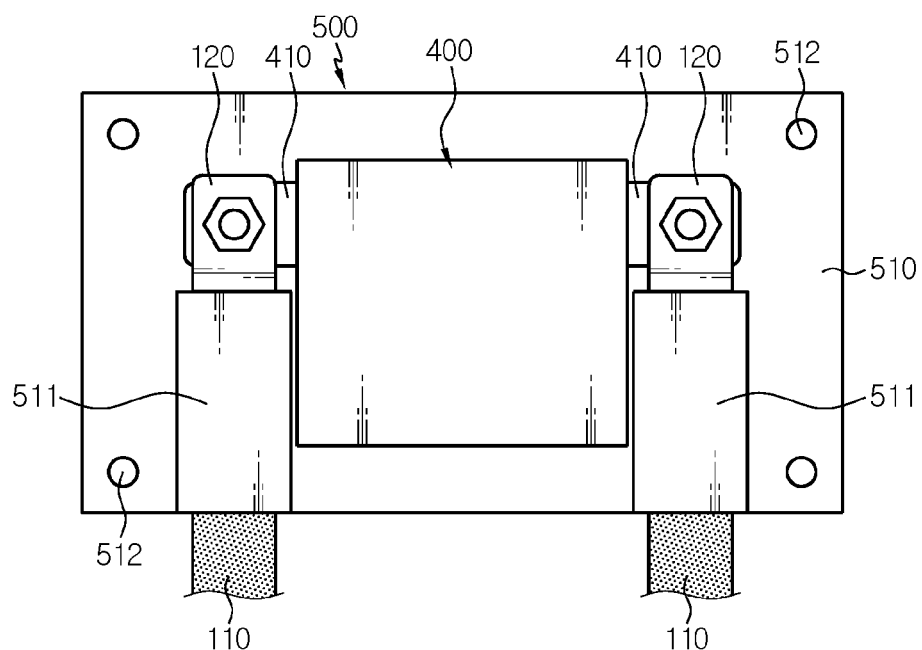
FIG. 7 is a plan view showing that the aluminum bus bar is connected to an electric component of FIG. 6.

FIG. 4 is a partial perspective view schematically showing a battery module according to an embodiment of the present disclosure, FIG. 5 is a sectional view, taken along the line I-I' of FIG. 4, FIG. 6 is a plan view schematically showing a portion of an electric component housing of the battery module according to an embodiment of the present disclosure, and FIG. 7 is a plan view showing that the aluminum bus bar is connected to an electric component of FIG. 6.

Hereinafter, a battery module 10 to which the aluminum bus bar 100 described above is applied will be described in more detail with reference to the features.

Referring to FIG. 4, the battery module 10 according to an embodiment of the present disclosure may include at least one aluminum bus bar 100, a cell assembly 200, a heatsink 300, an electric component 400, and an electric component housing 500.

The cell assembly 200 may include a plurality of battery cells 210 and a cell case 220 for accommodating the battery cells 210 in an inner space thereof.

As the battery cell 210, a pouch-type secondary battery may be employed. The pouch-type secondary battery cells may be stacked and arranged in the inner space of the cell case 220, which is advantageous in increasing energy density.

In addition, the pouch-type secondary battery cells may be accommodated such that edges of each cell are in contact with the cell case 220, so the heat of each cell may be dissipated to the heatsink 300 through the cell case 220. Here, the battery cell 210 is not limited as a pouch-type battery cell 210. For example, a cylindrical secondary battery cell or a rectangular secondary battery cell may also be employed.

The cell case 220 plays a role of accommodating the battery cells 210 and protecting them from external shocks. The cell case 220 may be preferably made of a metal material so as to have impact resistance and smoothly dissipate heat from the battery cells 210.

The heatsink 300 is disposed at one side of the cell assembly 200 to exchange heat with the cell assembly 200. The heatsink 300 of this embodiment may have a flow path through which a coolant flows, so as to absorb surrounding heat. Water with high latent heat is preferable as the coolant, but any material capable of absorbing heat while flowing along the flow path may be used.

The electric component 400 is a component for controlling the operation of the battery cells 210, and may be, for example, a relay for controlling the current of the battery module 10 or a current sensor for detecting the magnitude of the current. The electric component 400 may be accommodated or installed in the electric component housing 500, and the electric component housing 500 may be coupled to the cell case 220 or the heatsink 300.

The electric component 400 may be electrically connected to the cell assembly 200 by means of the aluminum bus bar 100. For example, an electrode terminal (not shown) of the cell assembly 200 and an electrode terminal 410 of the relay may be connected by the aluminum bus bar 100. That is, the aluminum bus bar 100 serves to form a current path between the electrode terminal (not shown) of the cell assembly 200 and the electrode terminal 410 of the relay.

In particular, as shown in FIGS. 4 and 5, in the battery module 10 according to the present disclosure, the insulation portion 110 of the aluminum bus bar 100 is in contact with one surface of the heatsink 300 and the cell case 220 is in contact with the other surface of the heatsink 300 such that the aluminum bus bar 100 and the battery cells 210 may be cooled simultaneously by one heatsink 300.

The assembly structure of the battery module 10 for cooling the aluminum bus bar 100 to the heatsink 300 for cooling the battery cells 210 will be described in detail as follows.

As shown in FIG. 6, the electric component housing 500 includes a plate-shaped base plate 510 in surface contact with the heatsink 300. The electric component 400 such as a relay may be installed at the center of the base plate 510. Although not shown for the convenience of the drawing, the base plate 510 is provided with a larger area and an additional electric component may be installed further. In addition, the electric component housing 500 may further include a housing cover (not shown) covering an upper portion of the base plate 510.

The base plate 510 of this embodiment has a tunnel portion 511 for efficiently fixing and connecting the aluminum bus bar 100. The tunnel portion 511 is a portion formed convexly from the edge of the base plate 510 toward the center rather than the other portion of the base plate 510. In other words, the tunnel portion 511 may be regarded as a portion having an uneven structure on the base plate 510. In front of an end of the tunnel portion 511, a bus bar passing hole 513 is provided through the plate surface of the base plate 510.

As shown in FIG. 7, in the aluminum bus bar 100, a part of the insulation portion 110 may be interposed in the tunnel portion 511, and the electric conduction portion 120 may be bent at a right angle at the insulation portion 110, pass through the bus bar passing hole 513 and is then bent again so as to be disposed on the upper surface of the electrode terminal of the electric component 400.

According to this configuration, the aluminum bus bar 100 may be assembled with the electric component housing 500 in a structure where a part of the insulation portion 110 is interposed in the tunnel portion 511 and placed in a state of holding the rear surface of the base plate 510 and the electric conduction portion 120 is fixed to the electrode terminal of the electric component 400 by a bolt B at the front surface of the base plate 510.

The aluminum bus bar 100, the electric component 400 and the electric component housing 500 assembled as described above may be integrally fixed to the cell assembly 200 to which the heatsink 300 is attached. For example, a method of matching bolt fastening holes 512 of the base plate 510 with holes (not shown) of the heatsink 300 for fixing the electric component housing 500 and then fastening the bolts B may be adopted.

Referring to FIGS. 4 and 5 again, the part of the insulation portion 110 interposed in the tunnel portion 511 comes into contact with one surface of the heatsink 300 in a state of being covered and pressed by the base plate 510, so it will be understood that the contact and fixability between the insulation portion 110 of the aluminum bus bar 100 and the heatsink 300 may be sufficiently secured.

In addition, a silicone gel-type thermally conductive pad 600 may be further interposed between the insulation portion 110 of the aluminum bus bar 100 and the heatsink 300 to further enhance contact, fixability and thermal conductivity.

The battery module 10 of the present disclosure having the above configuration may not only properly manage the temperature of the battery cells 210 but also cool the aluminum bus bar 100 in direct contact with the heatsink 300 by using the anodized aluminum bus bar 100, thereby further improving the electrical safety.

In particular, since the battery module 10 of the present disclosure simultaneously cools the bus bar and the battery cells 210 with one heatsink 300, it is possible to reduce the number of cooling parts and improve space efficiency accordingly.

Meanwhile, a battery pack according to the present disclosure may be configured to include at least one battery module 10 according to the present disclosure described above. The battery pack may further include various devices for controlling charging and discharging of each battery module 10, for example as a battery management system (BMS), a current sensor, a fuse and the like.

The battery pack may be applied to vehicles such as an electric vehicle or a hybrid electric vehicle. Also, the battery pack may be applied to energy storage systems or other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery module, comprising:
    a bus bar including:
        an insulation portion including an oxide film insulation layer; and
        first and second electric conduction portions having electric conductivity, wherein the insulation portion is interposed between the first and second electric conduction portions, wherein the bus bar is an aluminum bus bar; and
    a heatsink, wherein the insulation portion of the bus bar is in contact with a first surface of the heatsink.

2. The battery module according to claim 1, wherein the oxide film insulation layer is an aluminum oxide ($Al_2O_3$) layer formed on a surface of the insulation portion.

3. The battery module according to claim 1, further comprising:
    a cell assembly including a plurality of battery cells; and
    an electric component electrically connected to the cell assembly by the bus bar, wherein the heatsink is disposed at one side of the cell assembly and adapted to exchange heat with the cell assembly.

4. The battery module according to claim 3, further comprising:
    an electric component housing in which the electric component is housed,
    wherein the first or second electric conduction portion of the bus bar is mounted to the electric component housing, and
    the electric component housing is mounted to the heatsink.

5. The battery module according to claim 4,
    wherein the electric component housing includes a base plate in surface contact with the first surface of the heatsink, and the base plate includes a tunnel portion extending from an edge of the base plate portion toward a center of the base plate portion, wherein the tunnel portion includes a receiving space facing towards the base plate, and
    a first part of the insulation portion is positioned within the receiving space of the tunnel portion.

6. The battery module according to claim 5,
    wherein the first part of the insulation portion is disposed in contact with the first surface of the heatsink and covered by the tunnel portion of the base plate.

7. The battery module according to claim 5,
    wherein a plate surface of the base plate includes a clearance in front of an end of the tunnel portion, and the electric conduction portion extends through the clearance, wherein the electric conduction portion includes at least one bend to connect the insulation portion to an electrode terminal of the electric component.

8. The battery module according to claim 3,
    wherein the cell assembly further includes a cell case configured to accommodate the plurality of battery cells, and the cell case is in contact with a second surface of the heatsink.

9. The battery module according to claim 3, further comprising:
    a silicone gel-type thermally conductive pad positioned between the insulation portion of the bus bar and the heatsink.

10. A battery pack, comprising the battery module according to claim 3.

* * * * *